United States Patent

Morita

Patent Number: 5,833,159
Date of Patent: Nov. 10, 1998

[54] MAGNETIC TAPE CARTRIDGE

[75] Inventor: Kiyoo Morita, Kanagawa, Japan

[73] Assignee: Fuji Photo Film Co., Ltd., Kanagawa, Japan

[21] Appl. No.: 763,832

[22] Filed: Dec. 11, 1996

[30] Foreign Application Priority Data

Dec. 15, 1909 [JP] Japan ..................................... 7-327137

[51] Int. Cl.$^6$ .................................................. G11B 23/107
[52] U.S. Cl. ..................................... 242/346.2; 242/615.2
[58] Field of Search ................................ 242/346, 346.2, 242/615.2; 360/130.21, 132; 226/190

[56] References Cited

U.S. PATENT DOCUMENTS

| | | | |
|---|---|---|---|
| 3,542,303 | 11/1970 | Auld | 242/615.2 |
| 3,735,940 | 5/1973 | Schwartz | 242/346.2 |
| 3,829,040 | 8/1974 | Nelson | 242/615.2 |
| 4,440,359 | 4/1984 | Nelson | 242/346.2 |
| 4,607,808 | 8/1986 | Collins | 242/346.2 |
| 5,511,736 | 4/1996 | Miura | 242/346 |

FOREIGN PATENT DOCUMENTS 4-219663  8/1992  Japan ................................. 242/346.2

*Primary Examiner*—John P. Darling
*Attorney, Agent, or Firm*—McAulay Nissen Goldberg Kiel & Hand, LLP

[57] ABSTRACT

In a magnetic tape cartridge in which a guide roller for guiding the running trace of a magnetic tape is mounted on a cartridge body, a through hole is formed at a predetermined position in the cartridge body so that a center shaft of the guide roller is fitted into the through hole. The height of the cartridge body can be reduced, and, in the case where the guide roller is inclined, the inclined angle of the guide roller can be held accurately.

4 Claims, 3 Drawing Sheets

MAGNETIC TAPE CARTRIDGE

BACKGROUND OF THE INVENTION

The present invention relates to magnetic tape cartridges, and particularly to a magnetic tape cartridge suitable for use, for example, for a cassette tape in which a feed reel and a take-up reel are disposed in upper and lower positions.

In a cartridge of a conventional cassette tape, as shown in FIG. 5, a guide roller 102 is attached to a cartridge body 101 in order to guide the running trace of a magnetic tape 100. A boss 105 having a fitting hole 103 with a proper depth is provided on the cartridge body 101, and a center shaft 104 of a guide roller 102 is pressed into the fitting hole 103 of the boss 105 and fixed thereto.

In the above-mentioned cartridge of the conventional cassette tape, if the fitting hole 103 is bored in the cartridge body 101 as it is, the fitting hole 103 is so shallow that the center shaft 104 of the guide roller 102 cannot be surely fixed because the cartridge body 101 is very thin.

In general, therefore, a relatively high boss 105 is provided on the cartridge body 101 and the fitting hole 103 is formed in the boss 105 to thereby secure the sufficient depth of the fitting hole 103. In the cartridge of such a conventional cassette tape, however, the fitting hole 103 is bored to the depth to the midway of the cartridge body 101, and it is therefore necessary to make the boss 105 high enough in order to increase the supporting force of the guide roller 102 to improve the accuracy of rotation of the guide roller 102. Accordingly, there are such problems that the position of the fitting hole 103 with respect to the cartridge body 101 increases, the thickness of the cartridge body 101 only in the position increases, the appearance becomes poor because of generation of a sink, or the stability in dimension is lowered.

Further, FIG. 3 shows a cassette tape made previously by the present inventor. In the configuration of this cassette tape, a pair of reels are disposed vertically in upper and lower stages at a predetermined thickwise interval of the cartridge body and with their rotation centers substantially coincident with each other in the cartridge body. In this cassette tape, as shown in FIG. 6, it is necessary to make a fitting hole 103 inclined so that a guide roller 102 for guiding tape carrying between the reels in the upper and lower stages can be disposed slantingly. In such a case where the fitting hole 103 is made inclined, it is necessary to bore the fitting hole 103 by drilling work after formation of a cartridge body 101. Accordingly, there are problems that not only the number of working steps increases but also it is difficult to finish the inclined angle accurately, and, sometimes, the working error becomes large.

SUMMARY OF THE INVENTION

An object of the present invention is to solve conventional problems and to provide a magnetic tape cartridge in which the height of the cartridge body can be reduced, and, in the case where the guide roller is inclined, the inclined angle of the guide roller can be held accurately.

In order to attain the above object, according to an aspect of the present invention, in a magnetic tape cartridge in which a guide roller for guiding the running trace of a magnetic tape is mounted on a cartridge body, a through hole is formed at a predetermined position in the cartridge body so that a center shaft of the guide roller is fitted into the through hole.

In this magnetic tape cartridge, since the through hole is bored in the cartridge body in order to attach the pin of the guide roller, the depth of the through hole for supporting the center shaft is larger than that of the fitting hole which is bored to the midway of the thickness of the conventional cartridge body. Accordingly, the height of the boss through which this through hole is formed can be reduced so that the height of the cartridge body can be reduced.

DETAILED DESCRIPTION OF THE PREFERRED EMBODIMENTS

Figure 1:
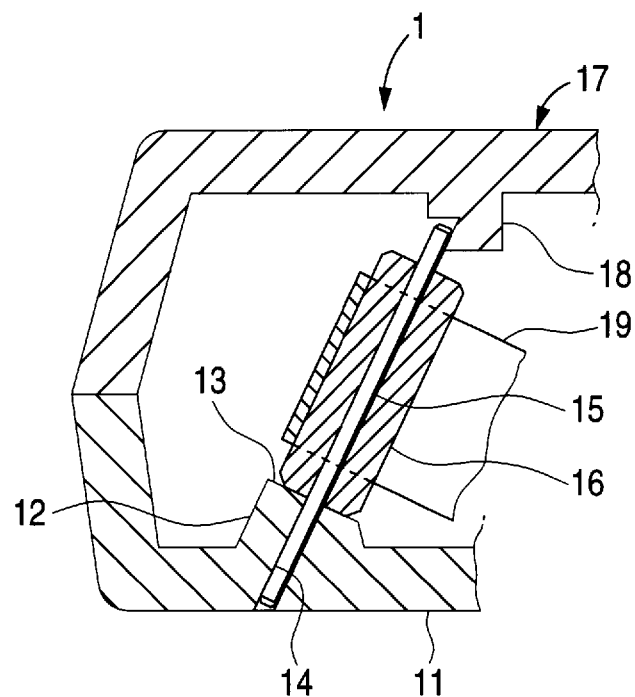
FIG. 1 is a partial sectional view showing the configuration of the magnetic tape cartridge according to the present invention.

Referring to the drawings, embodiments of the magnetic tape cartridge according to the present invention and the method for forming the same will be described below.

As shown in FIG. 1, in the magnetic tape cartridge 1 according to the present invention, a boss 12 is provided on a cartridge body 11. An upper surface 13 of the boss 12 is inclined at a predetermined angle relative to the horizontal direction, and a through hole 14 is provided perpendicularly to the upper surface 13.

A pin 15 which is a center shaft is pressed into the through hole 14 and a guide roller 16 is rotatably fitted onto the pin 15. The top end of the pin 15 is locked to a support portion 18 of an upper cover 17. A magnetic tape 19 is wrapped on the guide roller 16. Moreover, the guide roller 16 may be formed into a proper shape such as a cylindrical member or a reel-like member.

Figure 2:
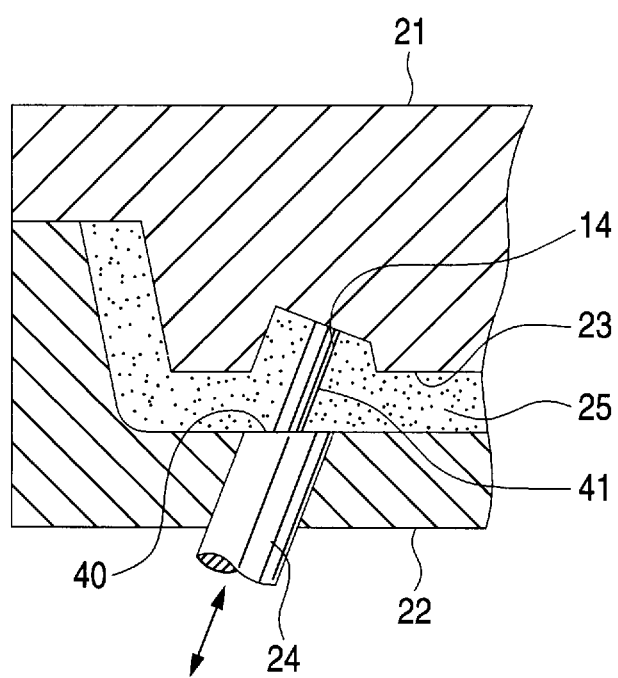
FIG. 2 is a sectional view for explaining the method of formation of the magnetic tape cartridge according to the present invention.

For the formation of the cartridge body 11, an upper mold 21, a lower mold 22 and a slide core 24 are used as shown in FIG. 2. In this case, a gap 23 corresponding to the cartridge body 11 is formed between the upper mold 21 and the lower mold 22, and the slide core 24 for forming the through hole 14 is disposed on the lower mold 22. After resin 25 is injected into the gap 23, the slide core 24 is pulled out, the upper mold 21 and the lower mold 22 are separated from each other, and the cartridge body 11 is taken out. In this embodiments, a projecting shaft portion 41 of the slide core 24 for forming the through hole 14 for supporting the pin 15 is inclined relative to an upper surface 40.

In this magnetic tape cartridge 1, since the through hole 14 is provided in the cartridge body 11 so as to attach the pin 15 which is the center shaft of the guide roller 16, the depth of the through hole 14 for supporting the pin 15 can be made large in comparison with the conventional fitting hole having a depth to the midway of the thickness of the cartridge body 11. Accordingly, the height of the boss 12 through which the through hole 14 is formed can be reduced, and, hence, the height of the cartridge body 11 can be reduced.

The through hole 14 can be easily formed by using the slide core 24 inserted from the outside of the cartridge body 11 at the time of molding, without being influenced by a rib provided in the inside of the cartridge body 11.

Further, also in the case where the through hole 14 is bored slantingly in order to dispose the guide roller slantingly, the number of working steps can be reduced because it is not necessary to perform drilling working after molding, and the inclined angle can be made accurate because the through hole 14 can be bored simultaneously with the molding of the cartridge body 11.

Figure 3:
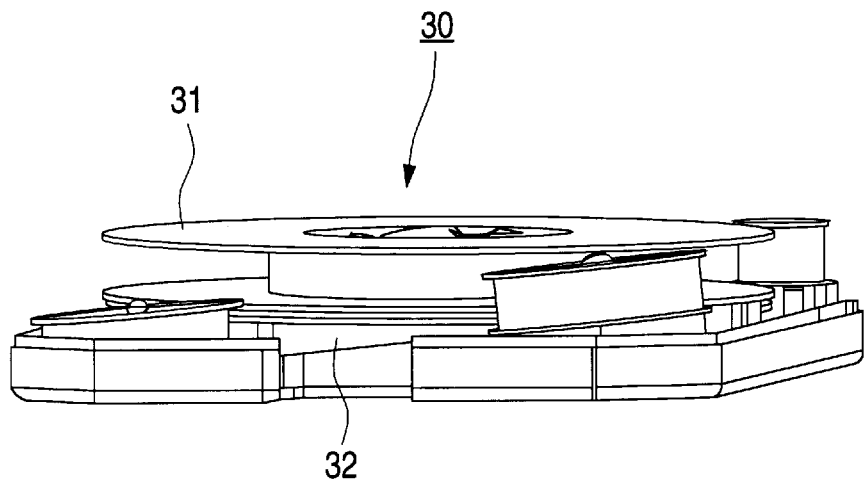
FIG. 3 is a perspective view of a cassette tape to which the magnetic tape cartridge according to the present invention is applied.

Accordingly, this magnetic tape cartridge 1 is suitable for the case where the feed reel 31 and the take-up reel 32 are disposed vertically in the upper and lower stages and the magnetic tape (not shown) is made to run from up to down like cassette tape 30 shown in FIG. 3.

Figure 4:
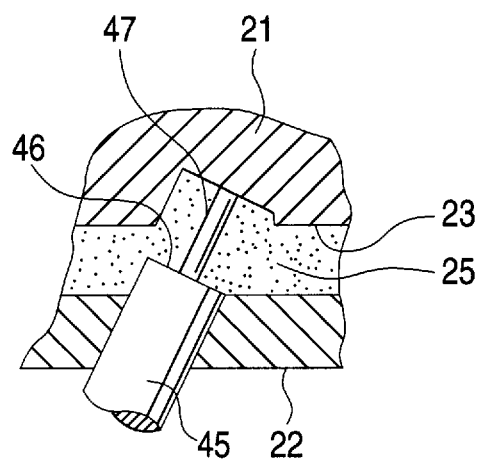
FIG. 4 is a sectional view showing another embodiment of the slide core according to the present invention.
Figure 5:
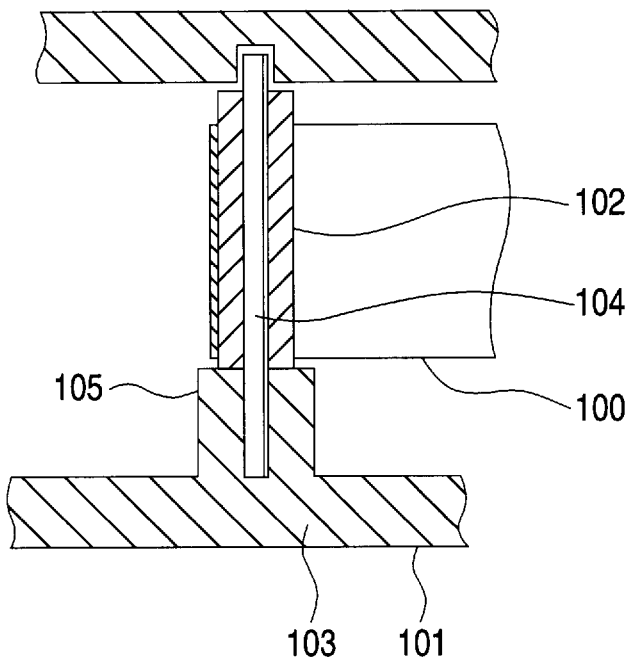
FIG. 5 is a partial sectional view of a first conventional example of the magnetic tape cartridge.
Figure 6:
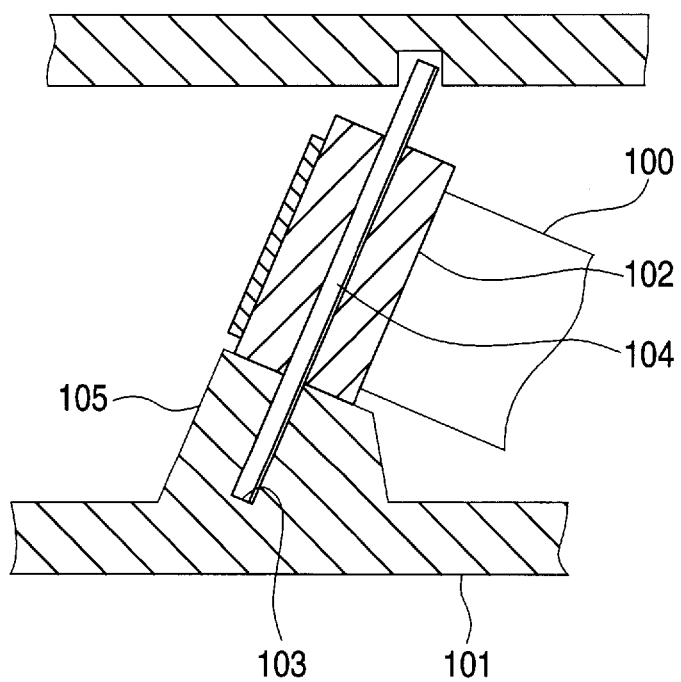
FIG. 6 is a partial sectional view of a second conventional example of the magnetic tape cartridge.

In the above embodiment, the case where the projecting shaft portion 41 of the slide core 24 is made inclined relative to the upper surface 40 (FIG. 2) is illustrated. The present invention is however not limited to this embodiment, but a projecting shaft portion 47 of a slide core 45 may be made perpendicular to an upper surface 46 as shown in FIG. 4.

Further, although the case where the guide roller 16 is attached slantingly relative to the bottom surface of the cartridge body 11 is illustrated in the above embodiment, the present invention may be applied to the case where the guide roller 16 is attached perpendicularly to the bottom surface of the cartridge body 11.

As described above, according to the present invention, in a magnetic tape cartridge in which a guide roller for guiding the running trace of a magnetic tape is provided on a cartridge body, a through hole is provided in a predetermined position in the cartridge body so that a center shaft of the guide roller is fitted into the through hole.

Accordingly, according to the magnetic tape cartridge of the present invention, since the through hole is bored in the cartridge body in order to attach the center shaft of the guide roller, the depth of the through hole for supporting the center shaft is larger than that of the fitting hole which is bored to the midway of the thickness of the conventional cartridge body. Accordingly, the height of the boss through which this through hole is formed can be reduced so that the height of the cartridge body can be reduced.

What is claimed is:

1. A magnetic tape cartridge for a magnetic tape, comprising:

a cartridge body including a boss having a through hole therein, the boss having an upper surface which is inclined at a predetermined angle relative to a horizontal direction of the cartridge body, the through hole being formed perpendicularly to the upper surface;

a guide roller mounted on the cartridge body for guiding a running trace of the magnetic tape, the guide roller having a center shaft; and the through hole formed in the cartridge body at a predetermined position of the cartridge body, the center shaft being fitted in the through hole.

2. The magnetic tape cartridge of claim 1, further comprising:

a pair of reels disposed vertically in upper and lower stages at a predetermined thickwise interval of the cartridge body;

in which rotation centers of said pair of reels are substantially coincided with each other in the cartridge body.

3. The magnetic tape cartridge of claim 1, wherein said guide roller further comprises a roller body which is disposed around said center shaft for guiding said running trace of the magnetic tape.

4. The magnetic tape cartridge of claim 1, wherein said cartridge body comprises an upper cover and an lower cover coupled with each other;

said boss is formed on the lower cover; and said upper cover is provided with a support portion for supporting a top end of said center shaft.

\* \* \* \* \*